(12) United States Patent
Mizuguchi (10) Patent No.: US 8,619,312 B2
(45) Date of Patent: Dec. 31, 2013

(54) IMAGE PROCESSING APPARATUS FOR ALLOCATING JOB DATA FOR RIP PROCESSING, IMAGE PROCESSING METHOD FOR ALLOCATING JOB DATA FOR RIP ROCESSING, AND COMPUTER-READABLE STORAGE MEDIUM

(75) Inventor: Takuya Mizuguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 589 days.

(21) Appl. No.: 12/878,348

(22) Filed: Sep. 9, 2010

(65) Prior Publication Data

US 2011/0235098 A1 Sep. 29, 2011

(30) Foreign Application Priority Data

Mar. 23, 2010 (JP) ................................. 2010-066840

(51) Int. Cl.
*G06F 3/12* (2006.01)
*G06K 15/00* (2006.01)
*G06F 7/38* (2006.01)
*G06F 15/16* (2006.01)

(52) U.S. Cl.
USPC ........ 358/1.17; 358/1.15; 358/1.16; 708/524; 709/201; 712/203

(58) Field of Classification Search
USPC ........ 358/1.15, 1.16, 1.17; 708/524; 709/201; 712/203
See application file for complete search history.

(56) References Cited

U.S. PATENT DOCUMENTS

2004/0196498 A1* 10/2004 Klassen ........................ 358/1.15
2006/0092432 A1* 5/2006 Ferlitsch ........................ 358/1.1
2008/0007754 A1 1/2008 Torii

FOREIGN PATENT DOCUMENTS

JP A-10-289066 10/1998
JP A-2008-15605 1/2008

* cited by examiner

*Primary Examiner* — Fred Guillermety
(74) *Attorney, Agent, or Firm* — Oliff & Berridge, PLC (57) ABSTRACT

An image processing apparatus includes: a receiving unit that receives job data of plural pages; plural RIP processors that interpret and expand the job data into raster images; and an allocating unit that allocates the plural pages of the job data to the plural RIP processors for RIP processing, the allocating unit dividing the job data based on a predetermined data size regardless of page breaks, allocating job data that is to be RIP processed to the plural RIP processors, sending job data, corresponding to and after the pages of the data that is to be RIP processed, to the plural RIP processors, and when a head part of the job data that is to be RIP processed allocated by the allocating unit is in the middle of a page, the plural RIP processors RIP processing the job data from the beginning of the next page.

9 Claims, 9 Drawing Sheets

IMAGE PROCESSING APPARATUS FOR ALLOCATING JOB DATA FOR RIP PROCESSING, IMAGE PROCESSING METHOD FOR ALLOCATING JOB DATA FOR RIP ROCESSING, AND COMPUTER-READABLE STORAGE MEDIUM

CROSS-REFERENCE TO RELATED APPLICATION

This application is based on and claims priority under 35 USC 119 from Japanese Patent Application No. 2010-066840 filed on Mar. 23, 2010.

BACKGROUND

1. Technical Field

The present invention relates to an image processing apparatus, an image processing method, and a computer-readable storage medium.

2. Related Art

Conventionally, there is a technology in which data described in page description language is divided into page units, the divided page units are converted into raster data which is then rendered.

SUMMARY

An image processing apparatus pertaining to a first aspect of the invention includes a receiving unit that receives job data for a plurality of pages; RIP processors that interpret and expand the job data into raster images; and an allocating unit that allocates the job data for the pages to the RIP processors for RIP processing, the allocating unit dividing the job data based on a predetermined data size regardless of page breaks, allocating job data that is to be RIP processed to the RIP processors, and sending job data, corresponding to and subsequent to the pages of the job data that are to be RIP processed, to the RIP processors, and when an initial part of the job data that is to be RIP processed as allocated by the allocating unit is in the middle of a page, the RIP processors RIP processing the job data from the beginning of the next page.

BRIEF DESCRIPTION OF THE DRAWINGS

Exemplary embodiment of the present invention will be described in detail based on the following figures, wherein.

DETAILED DESCRIPTION

First Exemplary Embodiment

Figure 1:
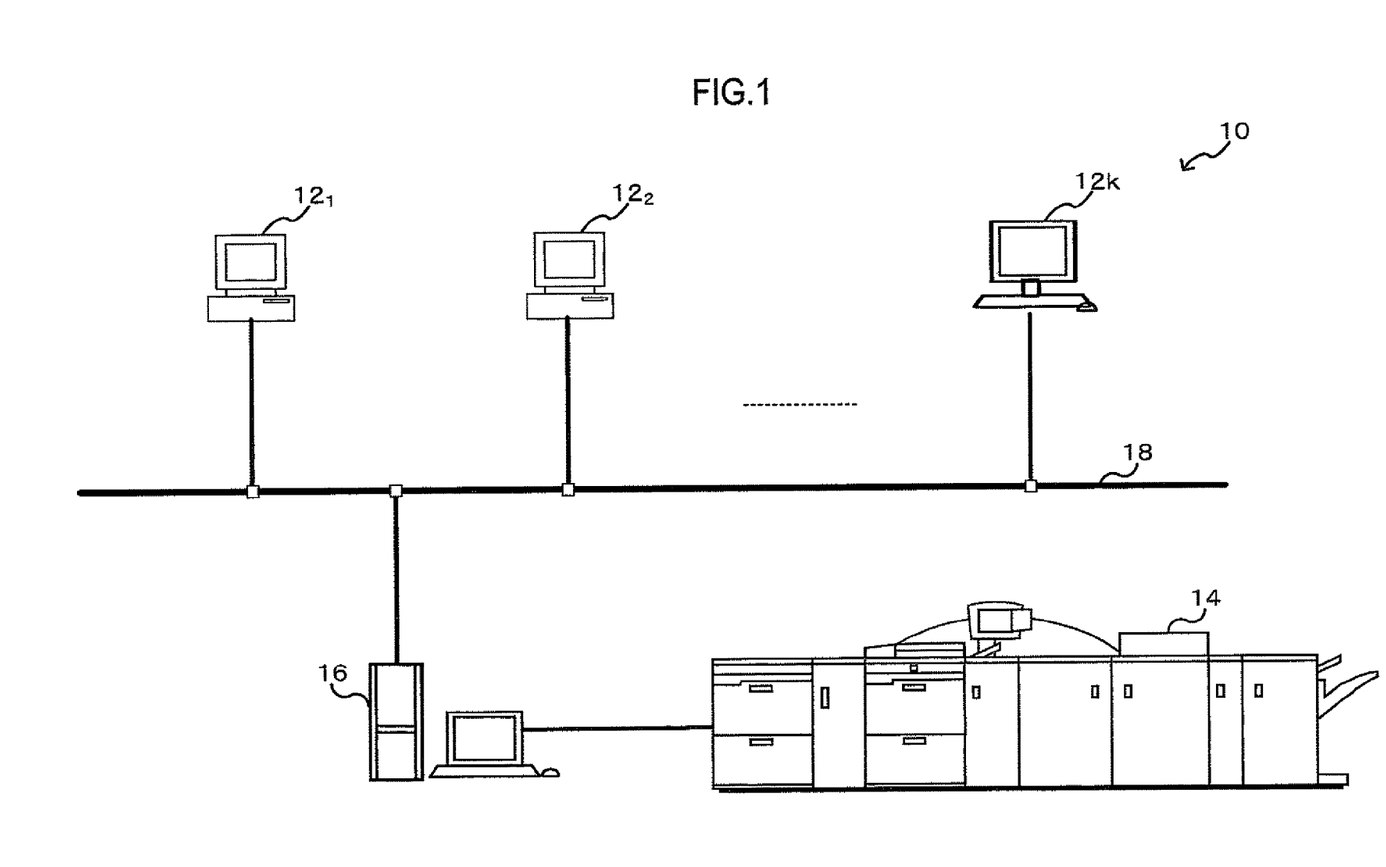
FIG. 1 is a general configuration diagram showing one example of the general configuration of an image processing system pertaining to a first exemplary embodiment.

First, the general configuration of an image processing system 10 in which image processing is performed by an image processing apparatus of the present exemplary embodiment will be described. FIG. 1 is a general configuration diagram showing one example of the general configuration of the image processing system 10 of the present exemplary embodiment.

The image processing system 10 of the present exemplary embodiment is configured to include client terminal devices $12_1$ to $12_k$, an image output apparatus 14, and an image processing apparatus 16. Signals and the like are mutually transmitted and received via a communication line 18 between the client terminal devices $12_1$ to $12_k$, the image output apparatus 14, and the image processing apparatus 16.

FIG. 1 shows a case where the image processing system 10 of the present exemplary embodiment is configured to include k number of the client terminal devices $12_1$ to $12_k$. However, when it is not necessary to distinguish between the individual client terminal devices, they will be generically called "the client terminal devices 12" without the subscript numbers indicating each of them.

The client terminal devices 12 are terminal devices used by clients utilizing the image processing system 10. In the present exemplary embodiment, the client terminal devices 12 have the function of outputting page description data (PDL; hereinafter called "job data") described in page description language in order for users of the client terminal devices 12 to output an image with the image output apparatus 14.

The image output apparatus 14 is an apparatus having the function of outputting an image based on image data outputted from the image processing apparatus 16. Example of the image output apparatus 14 include image forming apparatus such as printers that form an image on a recording medium.

The image processing apparatus 16 has the functioning of generating, from the job data outputted from the client terminal devices 12, image data for it to use when forming an image in the image output apparatus 14 (details described later). In the present exemplary embodiment, as one specific example, the image processing apparatus 16 RIP-processes the job data and generates the image data. For that reason, the image processing apparatus 16 receives the job data from the client terminal devices 12 and outputs the image data it has generated to the image output apparatus 14.

Figure 2:
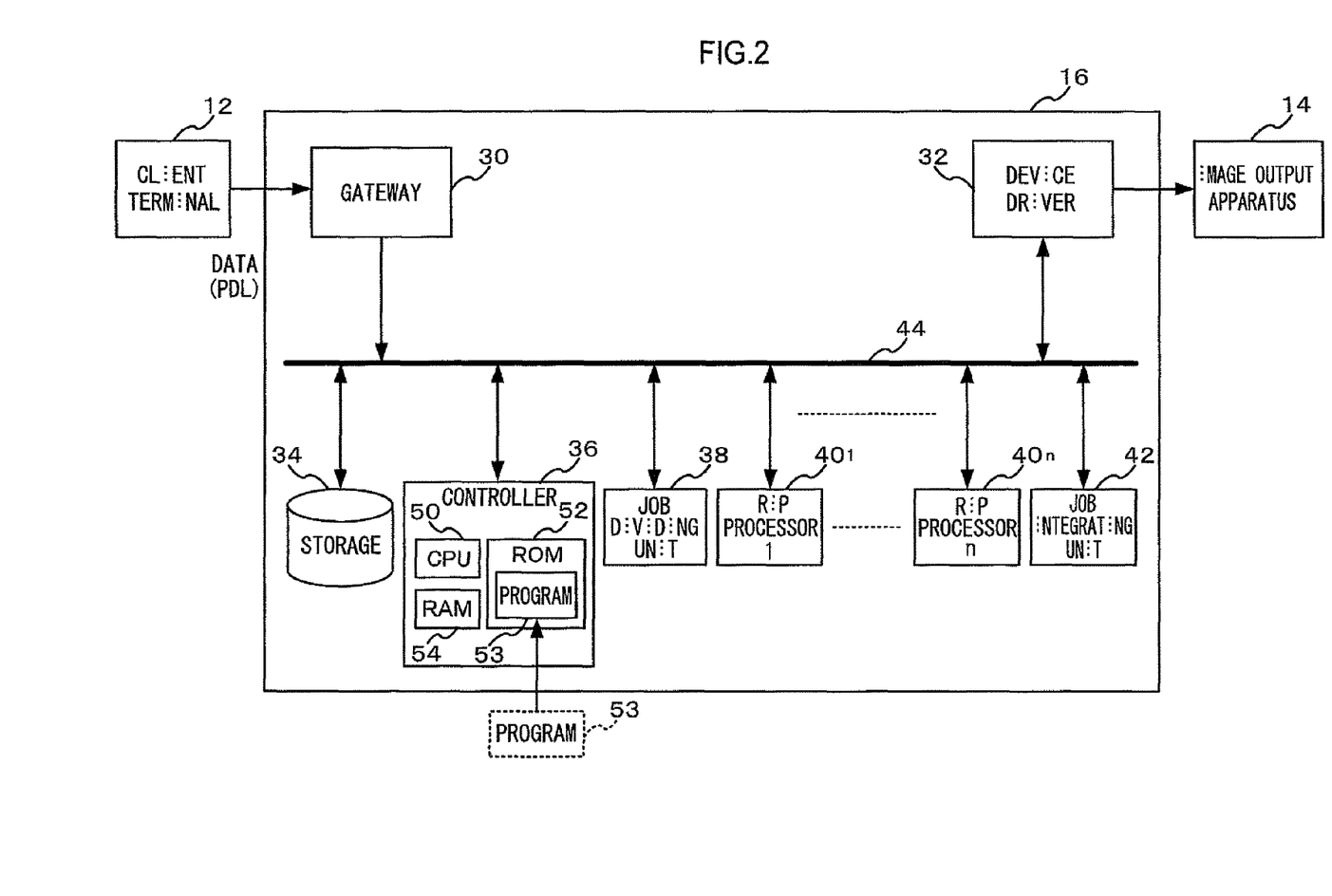
FIG. 2 is a functional block diagram showing one example of the general configuration of an image processing apparatus pertaining to the first exemplary embodiment.

The general configuration of the image processing apparatus 16 of the present exemplary embodiment will be described. FIG. 2 is a functional block diagram showing one example of the general configuration of the image processing apparatus 16. The image processing apparatus 16 of the present exemplary embodiment is equipped with a gateway 30, a device driver 32, a storage 34, a controller 36, a job dividing unit 38, RIP processors $40_1$ to $40_n$, and a job integrating unit 42.

Signals and the like are mutually transmitted and received via a communication line 44 between the gateway 30, the device driver 32, the storage 34, the controller 36, the job dividing unit 38, the RIP processors $40_1$ to $40_n$, and the job integrating unit 42.

The gateway 30 is software or the like that receives the job data from the client terminal devices 12. The device driver 32 is software or the like that outputs the image data to the image output apparatus 14.

The storage 34 stores the job data it has received and temporarily stores the image data that have been generated.

The controller 36 performs control of the image processing apparatus 16. Specifically, the controller 36 includes a CPU 50, a ROM 52, and a RAM 54. A processing program 53 executed in the CPU 50 is stored in the ROM 52. In the present exemplary embodiment, the program 53 has a configuration where it is stored beforehand. However, the program 53 is not limited to this and may also be stored in a recording medium or the like such as a CD-ROM or a removable device and installed in the controller 36 from the recording medium or may also be installed in the controller 36 from an external device via a communication line such as the Internet. The RAM 54 ensures a region for work when executing the program 53 in the CPU 50.

The job dividing unit 38 divides the job data in size units into a predetermined number of divisions and allocates the divided job data to each of the RIP processors 40. Because the job data are described in page description language, the data are described in a form where page breaks are recognized, but in this manner, in the present exemplary embodiment, the job dividing unit 38 performs division in size units regardless of page breaks. For that reason, there are cases where the divided job data begin in the middle of a page and cases where the divided job data end in the middle of a page.

In the present exemplary embodiment, the job dividing unit 38 performs the allocation by notifying each of the RIP processors $40_1$ to $40_n$ of start addresses (addresses of the job data stored in the storage 34) where each of the RIP processors 40 is to start RIP processing and the sizes (numbers of bytes) of the job data.

The RIP processors $40_1$ to $40_n$ perform RIP (Raster Image Processor) processing that analyzes the job data that have been allocated by the job dividing unit 38, renders the job data into raster image data, generates a bitmap for output in the image output apparatus 14, and converts the bitmap into a raster image, whereby the RIP processors $40_1$ to $40_n$ generate image data. FIG. 2 shows a case where the image processing system 10 of the present exemplary embodiment is equipped with n number of the RIP processors $40_1$ to $40_n$, but when it is not necessary to distinguish between the individual RIP processors, they will be generically called "the RIP processors 40" without the subscript numbers indicating each of them.

When a first page of the job data that have been allocated begins in the middle of a page, the RIP processors 40 of the present exemplary embodiment start the RIP processing from the next page. Further, when a last page of the job data that have been allocated is in the middle of a page, the RIP processors 40 perform the RIP processing to the end of that last page. That is, when the first page that has been allocated begins in the middle of a page, the RIP processors 40 perform the RIP processing with respect to the job data from the beginning of the next page to the end of the last page that has been allocated. Because of this, it is ensured that the RIP processors 40 do not duplicate the same page and perform the RIP processing.

The job integrating unit 42 integrates, in a page order, the job data that have been RIP-processed in each of the RIP processors 40.

Figure 3:
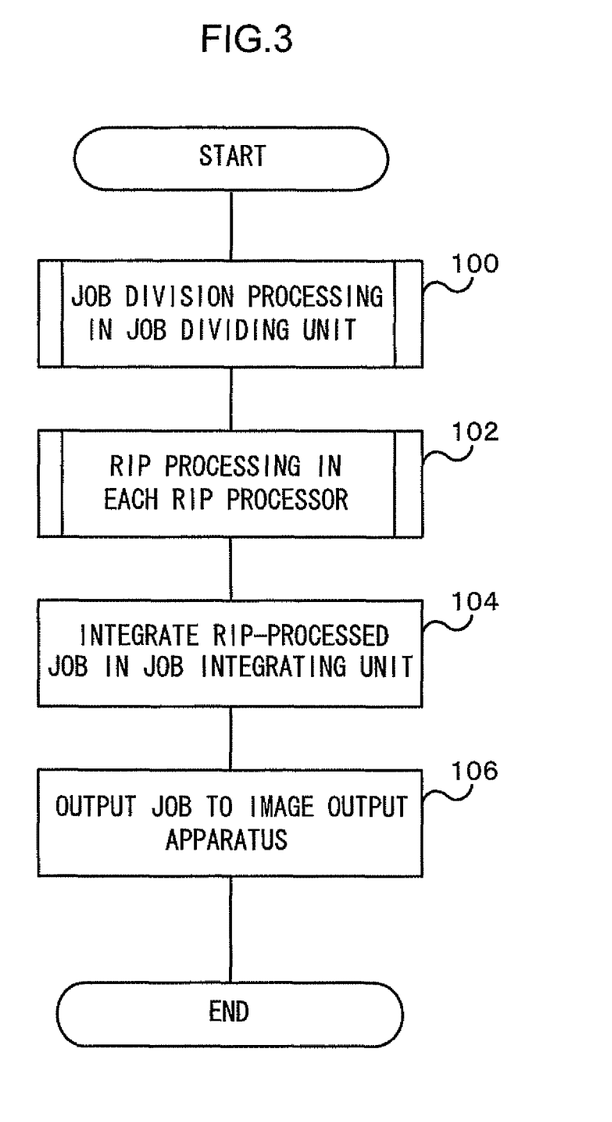
FIG. 3 is a flowchart showing one specific example of processing executed in a controller of the image processing apparatus pertaining to the first exemplary embodiment.
Figure 4:
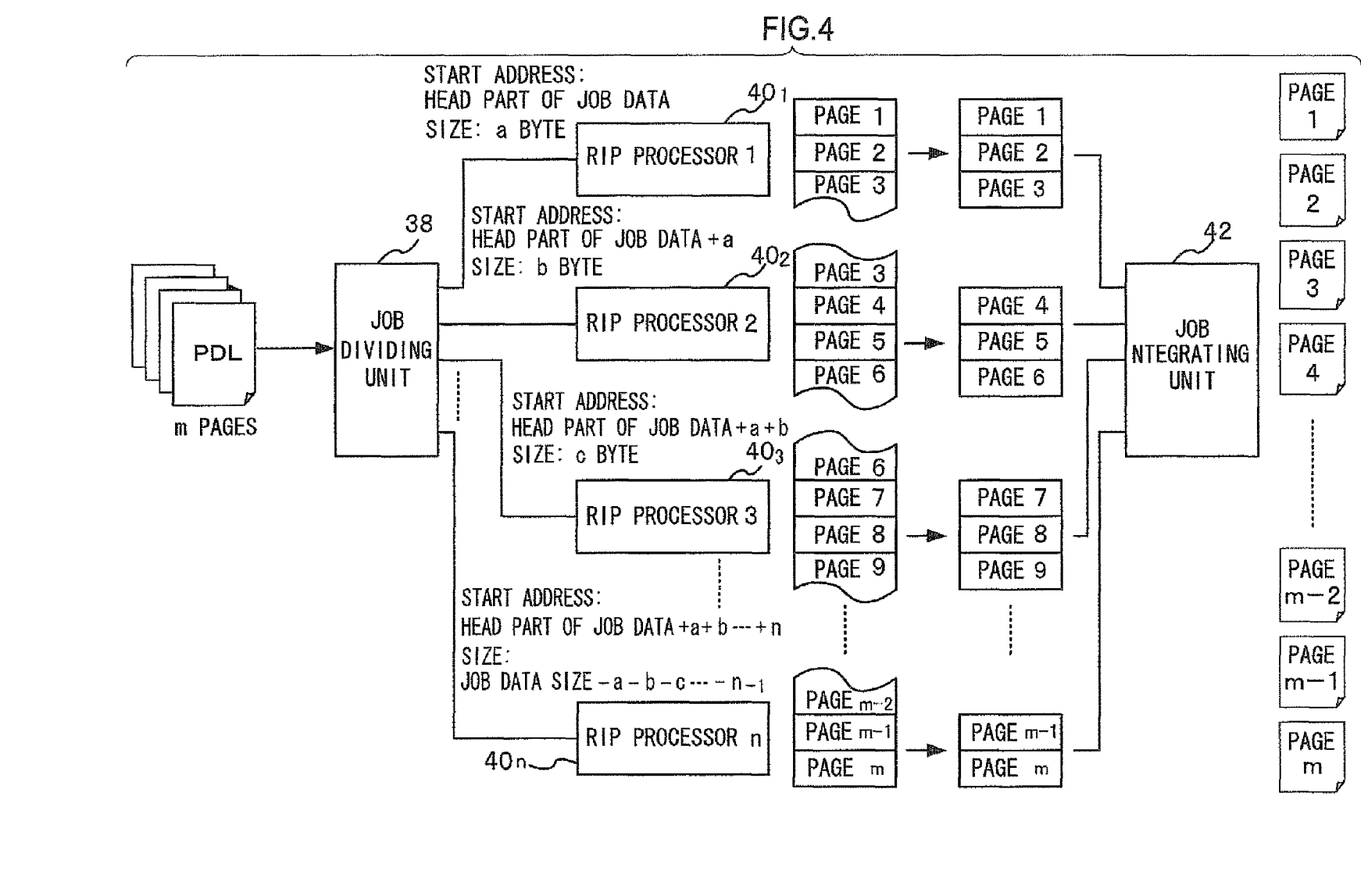
FIG. 4 is a schematic diagram schematically showing a flow of one specific example when the processing executed in the controller of the image processing apparatus pertaining to the first exemplary embodiment has been administered with respect to m pages of job data.

Next, the operation of the image processing apparatus 16 of the present exemplary embodiment will be described. FIG. 3 is a flowchart showing one example of processing executed in the controller 36 of the image processing apparatus 16 of the present exemplary embodiment. Further, FIG. 4 is a schematic diagram schematically showing a flow of one specific example when that processing has administered with respect to m pages of job data.

In step 100, the controller 36 causes the job dividing unit 38 to execute job division processing (details described later) that divides the job data. Thus, the job data are divided in size units, and the RIP processors 40 are notified of the start addresses and the sizes of the divided job data that each of the RIP processors 40 is to RIP-process.

In the next step 102, the controller 36 causes each of the RIP processors 40 to execute the RIP processing (details described later). Thus, the RIP processing is administered in each of the RIP processors 40 per each set of the divided job data. In the present exemplary embodiment, the job data to which the RIP processing has been administered are temporarily stored in the storage 34.

In the next step 104, the controller 36 causes the job integrating unit 42 to integrate the RIP-processed job data in the page order. In the next step 106, the controller 36 causes the driver device 32 to output the job data to which RIP processing has been administered (image data) to the image output apparatus 14. Thereafter, the controller 36 ends the present processing.

Figure 5:
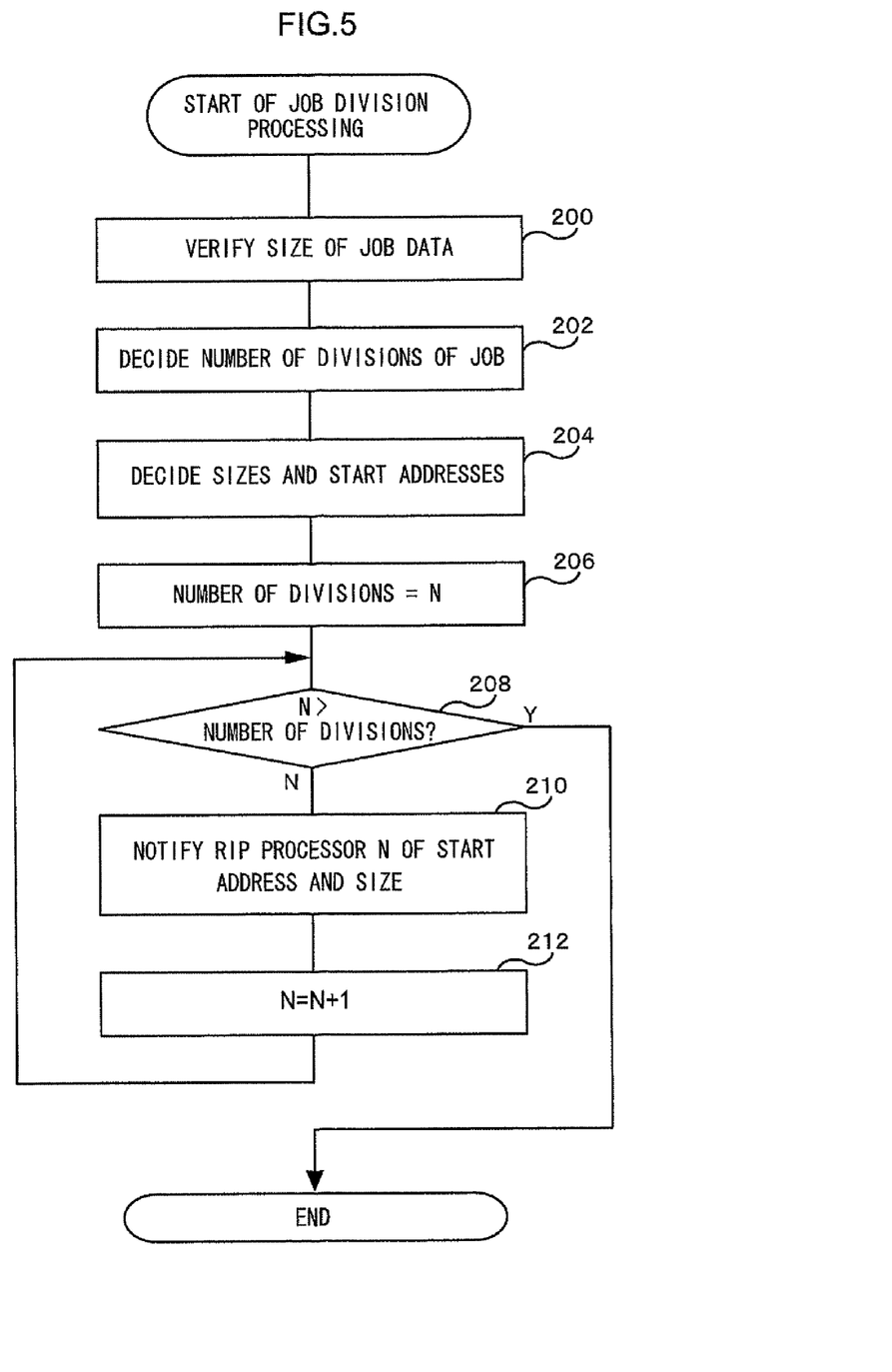
FIG. 5 is a flowchart showing one specific example of job division processing executed in a job dividing unit of the image processing apparatus pertaining to the first exemplary embodiment.

Next, details of the processing executed in each unit will be described. First, the job division processing (the processing of step 100 in FIG. 3) executed in the job dividing unit 38 will be described. FIG. 5 is a flowchart showing one example of the job division processing.

In step 200, the job dividing unit 38 references the storage 34 and verifies the size (number of bits) of the job data (all PDL data).

In the next step 202, the job dividing unit 38 decides the number of divisions of the job data. In the present exemplary embodiment, as one specific example, the job dividing unit 38 uses n, which is the number of the RIP processors 40, as the number of divisions.

In the next step 204, the job dividing unit 38 divides the job data in the number of divisions it has decided and decides the start addresses and the sizes of the job data that each of the RIP processors 40 is to process. Consequently, in the present exemplary embodiment, the job dividing unit 38 uses a quotient obtained by dividing the size of the job data by n as the size of the job data that each of the RIP processors 40 is to process. However, when the size of the job data cannot be divided by n, it suffices for the job dividing unit 38 to use a number that has been rounded up or rounded down and to adjust the sizes of the job data depending on the size of the job data that the last RIP processor 40 (the RIP processor $40_n$) is to process.

In the next step 204, the job dividing unit 38 defines the number of divisions as a variable N used in allocation processing. That is, in the present exemplary embodiment, the job dividing unit 38 defines N as being equal to n (N=n). In the next step 208, the job dividing unit 38 judges whether or not the number of divisions is larger than N. When the number of divisions is smaller than N, the judgment is NO and the job dividing unit 38 proceeds to step 210. In step 210, the job dividing unit 38 notifies the RIP processor 40$_N$ (RIP processor N) of the start address and the size of the job data. In the next step 212, the job dividing unit 38 increments the variable N (variable N=N+1). Thereafter, the job dividing unit 38 returns to step 208. In this manner, because of the processing of steps 208 to 212, the job dividing unit 38 notifies each of the RIP processors 40 of the start addresses and the sizes of the job data.

In the present exemplary embodiment, as shown as one example in FIG. 4, for the RIP processor 40$_1$, the address of the head part of the job data is allocated as the start address and a (a=m/n; fractions rounded up) is allocated as the size, and the RIP processor 40$_1$ is notified of these pieces of information. Further, for the RIP processor 40$_2$, the address of the head part of the job data+a is allocated as the start address and b (b=a) is allocated as the size, and the RIP processor 40$_2$ is notified of these pieces of information. Moreover, for the RIP processor 40$_3$, the address of the head part of the job data+a+b is allocated as the start address and c (c=b=a) is allocated as the size, and the RIP processor 40$_3$ is notified of these pieces of information. In the same manner, an address and a size are allocated to the other RIP processors 40. For the RIP processor 40$_n$, the address of the head part of the job data+a+b+c+ . . . +(n−1) is allocated as the start address and the size of all of the job data−a−b−c− . . . −(n−1) is allocated as the size, and the RIP processor 40$_n$ is notified of these pieces of information.

When the job dividing unit 38 has notified all of the RIP processors 40, the judgment in step 208 becomes YES and the job dividing unit 38 ends the present processing.

Figure 6:
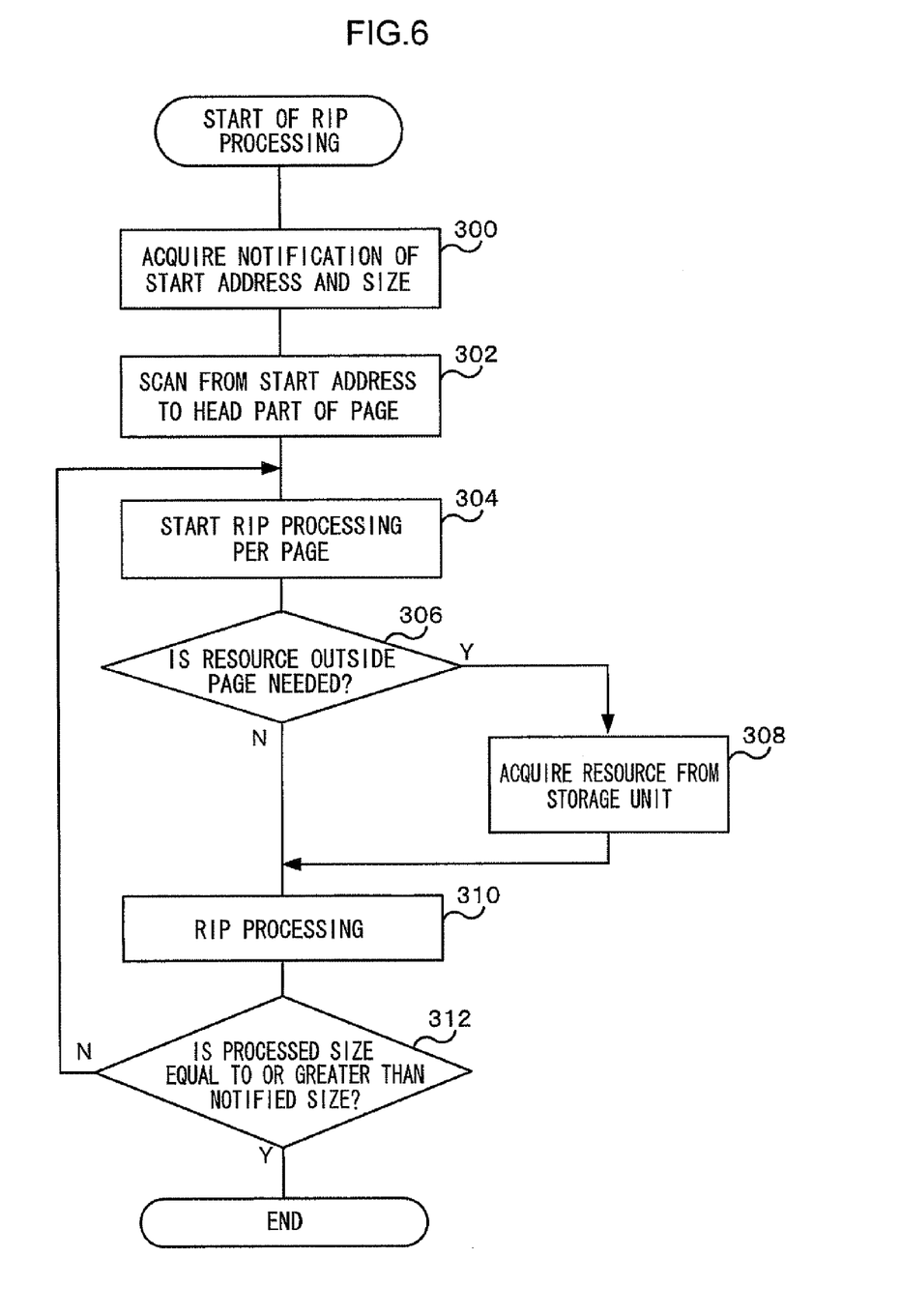
FIG. 6 is a flowchart showing one specific example of RIP processing executed in RIP processors of the image processing apparatus pertaining to the first exemplary embodiment.

Next, the RIP processing (the processing of step 102 in FIG. 3) executed in each of the RIP processors 40 will be described. FIG. 6 is a flowchart showing one example of the RIP processing.

In step 300, the RIP processor 40 acquires the start address and the size of the job data of which it has been notified by the job dividing unit 38. In the next step 302, the RIP processor 40 scans the job data in the storage 34 from the start address to the head part of a page. When the start address is the head part of a page (when the first page included in the job data begins from the head part of a page), it is the address of the head part of the first page, and when the start address is the middle of a page (when the first page included in the job data begins in the middle of a page), it is to the address of the head part of the next page. Because of this, in the present exemplary embodiment, when the first page begins in the middle of a page, the RIP processor 40 skips over the data to the head part of the next page.

In the next step 304, the RIP processor 40 starts the RIP processing per page. In the next step 306, the RIP processor 40 judges whether or not a resource outside the page is needed. In the present exemplary embodiment, when a resource needed for the page on which the RIP processor 40 is performing the RIP processing is not included from the start address to the page currently being RIP-processed, the RIP processor 40 judges that the resource outside the page is necessary and the judgment in step 306 becomes YES. Then, the RIP processor 40 proceeds to step 308 and acquires the resource from the storage 34. Thereafter, the RIP processor 40 proceeds to step 310. On the other hand, when a resource outside the page is not needed in step 306, the judgment in step 306 becomes NO and the RIP processor 40 proceeds to step 310.

In step 310, the RIP processor 40 continues the RIP processing. In the next step 312, the RIP processor 40 judges whether or not the processed job data are equal to or greater than the size of which it was notified. When the processed job data are smaller than the size of which the RIP processor 40 was notified, there are still unprocessed pages, so the judgment in step 312 becomes NO and the RIP processor 40 returns to step 304 and repeats the RIP processing. On the other hand, when the processed job data are equal to or greater than the size of which the RIP processor 40 was notified, the judgment in step 312 becomes YES and the RIP processor 40 ends the present processing.

In the present exemplary embodiment, as shown as one example in FIG. 4, when the head part of page 1 to the middle of page 3 has been allocated to the RIP processor 40$_1$, the RIP processor 40$_1$ RIP-processes page 1 to page 3. Further, when the middle of page 3 to the middle of page 6 has been allocated to the RIP processor 40$_2$, the RIP processor 40$_2$ RIP-processes page 4 to page 6. Moreover, when the middle of page 6 to the middle of page 9 has been allocated to the RIP processor 40$_3$, the RIP processor 40$_3$ RIP-processes page 7 to page 9. In the same manner, the other RIP processors 40 also perform the RIP processing. When the middle of page m−2 to the end of page m has been allocated to the RIP processor 40$_n$, the RIP processor 40$_n$ RIP-processes page m−1 to page m.

As described above, in the present exemplary embodiment, the image processing apparatus 16 stores in the storage 34 the job data (PDL data) received from the client terminal devices 12, and the job dividing unit 38 divides the job data in size units regardless of page breaks indicated in the job data and allocates the divided job data to each of the RIP processors 40. Specifically, the job dividing unit 38 uses a quotient obtained by dividing the size of the job data by the number of the RIP processors 40 as the size of the divided job data that each of the RIP processors 40 is to process. Additionally, the job dividing unit 38 notifies the RIP processors 40 of the start addresses of each of the sets of the divided job data. When the allocated start address is the middle of a page, the RIP processors 40 scan the job data to the head part of the next page and skip over the data. On the other hand, when the start address is the top of a page, the RIP processors 40 start the RIP processing of the job data from there. Moreover, when the RIP processors 40 have judged that a resource outside the page is necessary, the RIP processors 40 acquire that resource from the storage 34. The job integrating unit 42 integrates, in the page order, the job data that have been RIP-processed in each of the RIP processors 40, and the integrated job data are outputted to the image output apparatus 14 via the device driver 32.

Figure 7:
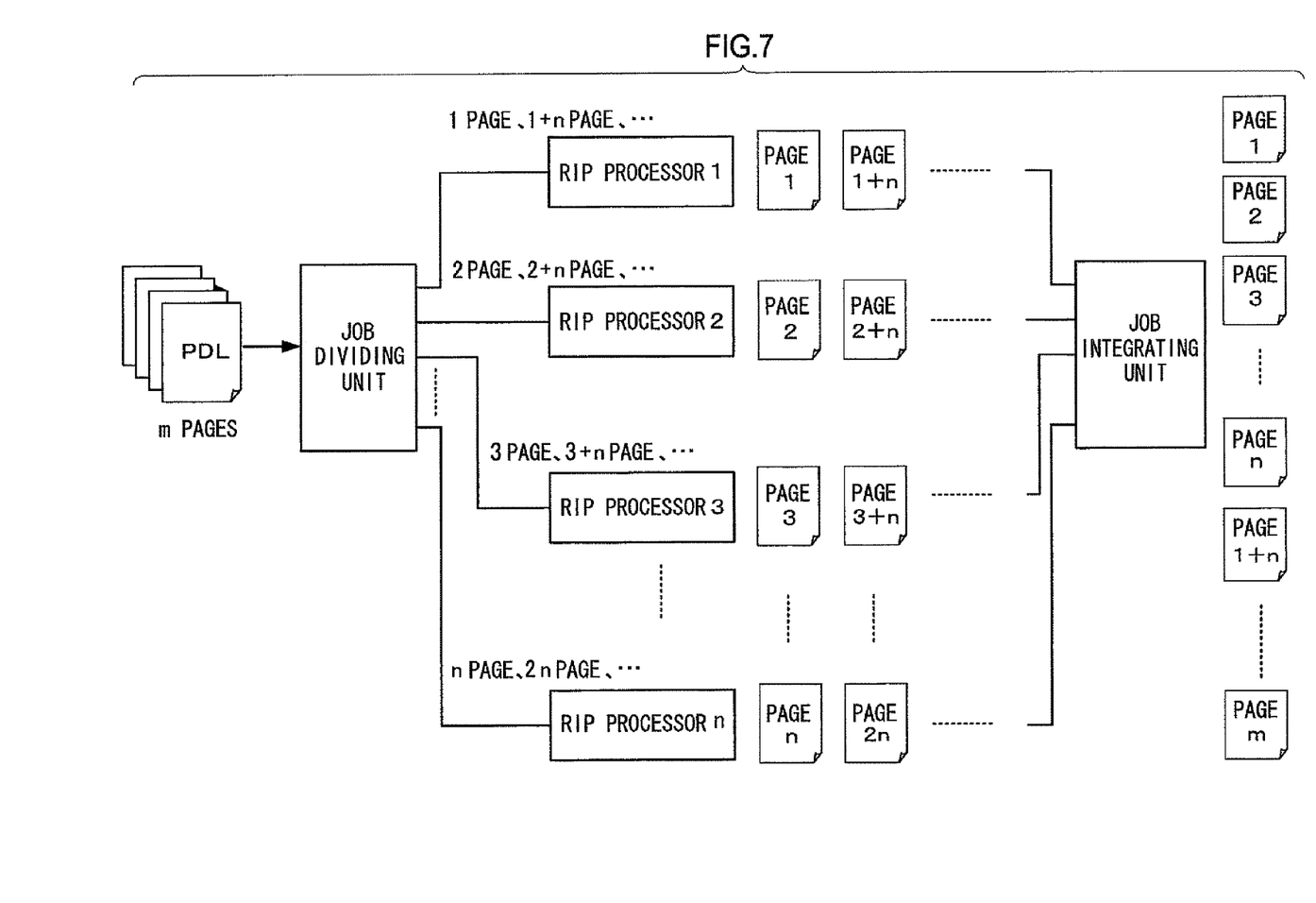
FIG. 7 is a schematic diagram schematically showing a flow of one specific example when an image processing apparatus that divides job data in page units divides and RIP-processes m pages of job data.

In this manner, in the present exemplary embodiment, the job dividing unit 38 divides the job data in size units into a predetermined number of divisions and allocates the divided job data to each of the RIP processors 40. Here, for comparison with the present exemplary embodiment, an image processing apparatus of a form that divides the job data in page units and allocates the divided job data to each of the RIP processors will be described. FIG. 7 is a schematic diagram schematically showing a flow of one specific example when such an image processing apparatus divides and RIP-processes m pages of job data. When the image processing apparatus divides the job data in page units, the job dividing unit repeats, until the last page (page m), processing that scans all of the job data and allocates the job data to each of the RIP processors per page break. Consequently, the processing that scans all of the job data, judges the page breaks, and divides the job data requires time. When the size of the job data becomes large (when the quantity of pages becomes large), the amount of processing time required in the job dividing unit becomes longer in correspondence therewith. However, the job dividing unit 38 of the present exemplary embodiment divides the job data in size units and does not need to scan all of the job data and judge the page breaks, so it can perform the division processing in a short amount of time. Further, the amount of time required for the division processing does not change much regardless of the size of the job data (the quantity of pages).

Consequently, in the present exemplary embodiment, the entire amount of processing time is shortened in comparison to when the job data are divided in accordance with the page breaks.

Further, because the job data are divided in size units, there are cases where the divided job data begin in the middle of a page and cases where the divided job data end in the middle of a page. However, when the allocated start address is the middle of a page, the RIP processors 40 scan the job data to the head part of the next page and skip over the data. Additionally, when the last page is the middle of a page, the RIP processors 40 acquire the data to the end of that last page and administer the RIP processing. Thus, page omission and duplication are prevented.

In the present exemplary embodiment, the job dividing unit 38 uses the number of the RIP processors 40 as the number of divisions of the job (step 202 in FIG. 5), but the job dividing unit 38 is not limited to this. For example, the job dividing unit 38 may also use a number larger than the number of the RIP processors 40 as the number of divisions of the job. In this case, for example, it suffices for the image processing apparatus 16 to be configured such that the controller 36 monitors the processing status of each of the RIP processors 40 and controls the job dividing unit 38 such that the job dividing unit 38 allocates, to the RIP processors 40 that have finished their RIP processing, the divided job data that it has not yet allocated. Thus, the amount of time required for the RIP processing is shortened. Further, each of the RIP processors 40 notifies the job integrating unit 42 sequentially beginning with the job data on which the RIP processing has ended, whereby integration of the job in the job integrating unit 42 becomes performed in parallel with the RIP processing. For this reason, the amount of processing time is shortened. Moreover, the image processing apparatus 16 sequentially outputs the integrated job data to the image output apparatus 14, whereby the start of the image output operation is quickened in the image output apparatus 14.

Further, in the present exemplary embodiment, the job dividing unit 38 equalizes the sizes (excluding the RIP processor 40$_n$) of the job data it allocates to the RIP processors 40. However, the job dividing unit 38 is not limited to this and may also vary the sizes depending on the RIP processors 40. For example, the job dividing unit 38 may also vary the sizes it allocates depending on the performance of each of the RIP processors 40, the width of the bus connected to the communication line 44, or the processing burden.

Second Exemplary Embodiment

Figure 8:
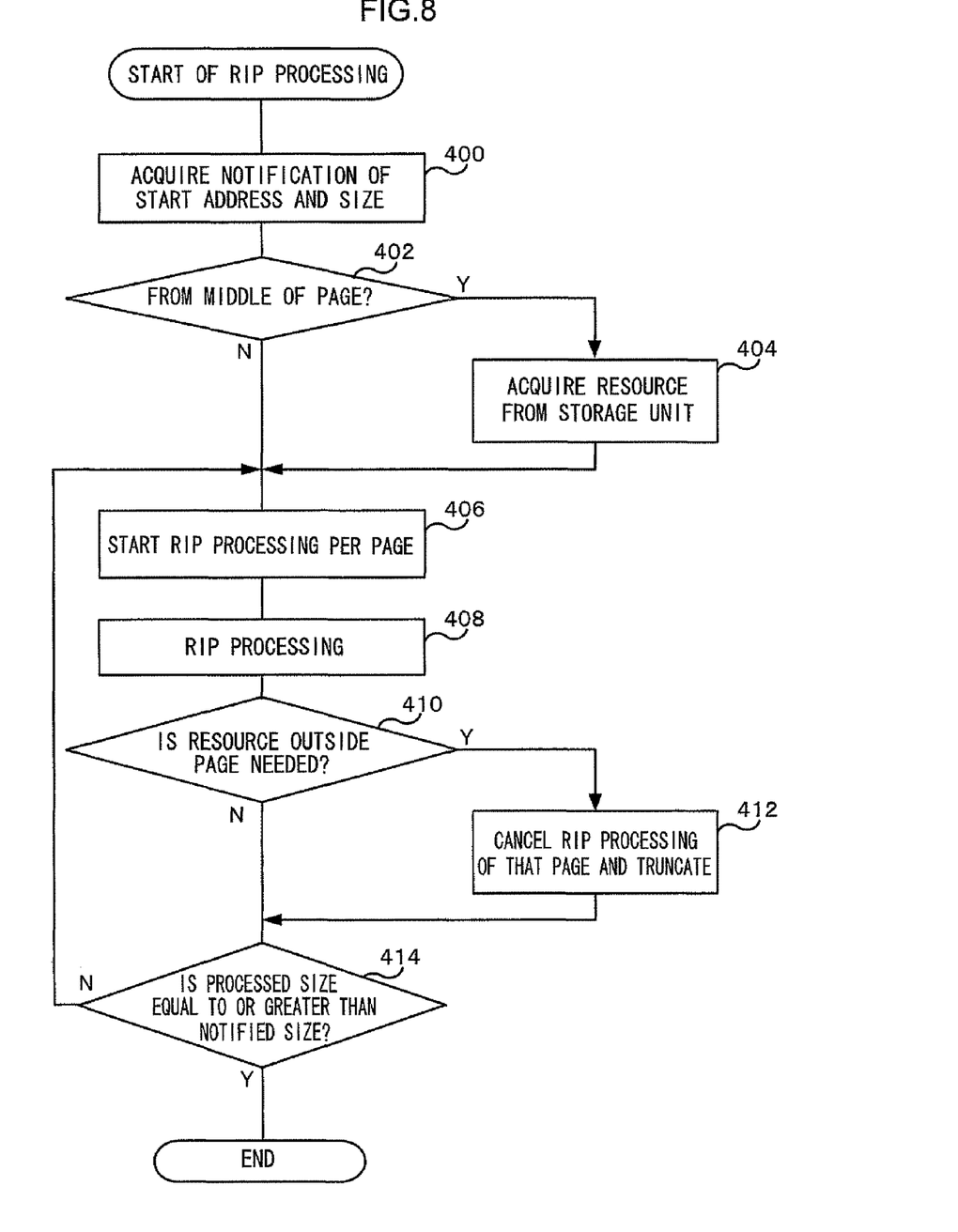
FIG. 8 is a flowchart showing one specific example of RIP processing executed in RIP processors of an image processing apparatus pertaining to a second exemplary embodiment.
Figure 9:
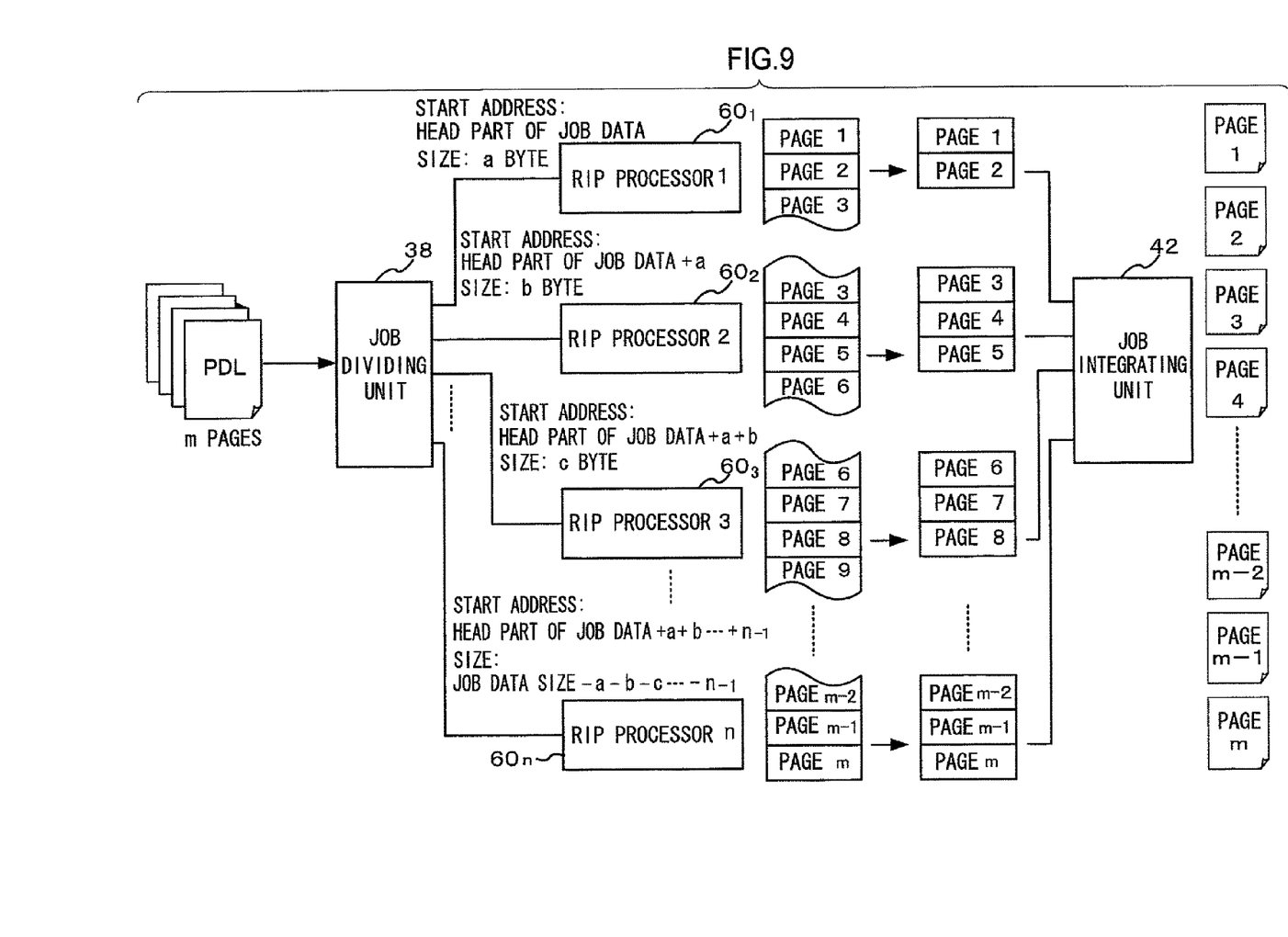
FIG. 9 is a schematic diagram schematically showing a flow of one specific example when the processing executed in a controller of the image processing apparatus pertaining to the second exemplary embodiment has been administered with respect to m pages of job data.

A second exemplary embodiment of the present invention will be described below with reference to the drawings. The present exemplary embodiment has substantially the same configuration and operation as the first exemplary embodiment except that the operation of the RIP processors 40 of the image processing apparatus 16 of the first exemplary embodiment is different. Thus, detailed description will be omitted, and the operation of RIP processors 60 of the present exemplary embodiment will be described. FIG. 8 is a flowchart showing one example of the RIP processing of the present exemplary embodiment. Further, FIG. 9 is a schematic diagram schematically showing a flow of one specific example when processing has been administered with respect to m pages of job data.

Step 400 corresponds to step 300 of the RIP processing (FIG. 6) of the first exemplary embodiment, step 406 corresponds to step 304, step 408 corresponds to step 310, step 410 corresponds to step 306, and step 414 corresponds to step 312. For this reason, detailed description will be omitted.

In step 400, the RIP processor 60 acquires the start address and the size. In step 402, the RIP processor 60 judges whether or not the job data begin in the middle of a page. When the job data begin from the head part of a page, the judgment in step 402 becomes NO and the RIP processor 60 proceeds to step 406. On the other hand, when the job data begin in the middle of a page, the judgment in step 402 becomes YES and the RIP processor 60 proceeds to step 404. In step 404, the RIP processor 60 acquires the resource to the head part of the page from the storage 34. Thereafter, the RIP processor 60 proceeds to step 406. In the present exemplary embodiment, the RIP processor 60 scans the job data to the head part of the page going back through the address from the start address of which it was notified and acquires the resource from that head part.

In step 406, the RIP processor 60 starts the RIP processing per page. In the next step 408, the RIP processor 60 performs the RIP processing. In the next step 410, the RIP processor 60 judges whether a resource outside the page is needed. When a resource outside the page is not needed, the judgment in step 410 becomes NO and the RIP processor 60 proceeds to step 414. On the other hand, when the last page is in the middle of a page, the judgment of step 410 becomes YES and the RIP processor 60 proceeds to step 412. Thereafter, the RIP processor 60 proceeds to step 414. In step 412, the RIP processor 60 cancels the RIP processing of that last page and truncates that last page.

In step 414, the RIP processor 60 judges whether or not the processed size is equal to or greater than the size of which it was notified. When the judgment is NO, the RIP processor 60 returns to step 406 and repeats the present processing. When the judgment is YES, the RIP processor 60 ends the present processing.

In this manner, in the present exemplary embodiment, when the allocated start address is the middle of a page, the RIP processor 60 scans the job data back to the head part of that page and acquires the data. On the other hand, when the start address is the head part of a page, the RIP processor 60 starts the RIP processing of the job data from there. Moreover, when the last page is the middle of a page, the RIP processor 60 cancels the RIP processing of that last page, truncates that last page, and administers the RIP processing to the page before that last page. That is, when the allocated last page is in the middle of a page, the RIP processor 60 performs the RIP processing with respect to the job data from the beginning of the allocated pages to the end of the page before the last page that has been allocated. Consequently, in the present exemplary embodiment also, the job dividing unit 38 divides the job data in size units. For this reason, the entire amount of processing time is shortened in comparison to when the job data are divided in accordance with the page breaks. Further, because the RIP processors 60 perform the RIP processing as described above, page omission and duplication are prevented.

What is claimed is:

1. An image processing apparatus comprising:
a receiving unit that receives job data for a plurality of pages;
a plurality of RIP processors that interpret and expand the job data into raster images; and
an allocating unit that allocates the job data for the plurality of pages to the plurality of RIP processors for RIP processing,
the allocating unit dividing the job data based on a predetermined data size regardless of page breaks, allocating job data that is to be RIP processed to the plurality of RIP processors, and sending job data corresponding to the pages of the job data that are to be RIP processed, to the plurality of RIP processors, wherein
if an initial part of the job data that is to be RIP processed as allocated by the allocating unit is in the middle of a page, the plurality of RIP processors RIP processing the job data from the beginning of the next page, and
if an end part of the job data that is to be RIP processed and allocated to the RIP processor is in the middle of a page, the RIP processor acquires the job data to the end of the page based on the job data subsequent to the pages of the job data that are to be RIP processed, and RIP processes to the end of the page.

2. The image processing apparatus according to claim 1, further comprising an integrating unit that integrates, in page order, the raster image data that have been expanded by the plurality of RIP processors.

3. A non-transitory computer-readable storage medium storing a program for causing a computer to execute image processing, the image processing comprising:
receiving job data for a plurality of pages;
using a plurality of RIP processors, interpreting and expanding the job data into raster images; and
allocating the job data for the plurality of pages to the plurality of RIP processors for RIP processing,
the allocating comprising:
dividing the job data based on a predetermined data size regardless of page breaks,
allocating job data that is to be RIP processed to the plurality of RIP processors,
sending job data corresponding to the pages of the job data that are to be RIP processed, to the plurality of RIP processors, wherein
if an initial part of the job data that is to be RIP processed is in the middle of a page, the plurality of RIP processors RIP processing the job data from the beginning of the next page, and
if an end part of the job data that is to be RIP processed and allocated to the RIP processor is in the middle of a page, the RIP processor acquires the job data to the end of the page based on the job data subsequent to the pages of the job data that are to be RIP processed, and RIP processes to the end of the page.

4. The non-transitory computer-readable storage medium according to claim 3, wherein the image processing further comprises integrating, in page order, the raster image data that have been expanded by the plurality of RIP processors.

5. An image processing method comprising:
receiving job data for a plurality of pages;
using a plurality of RIP processors, interpreting and expanding the job data into raster images; and
allocating the job data for the plurality of pages to the plurality of RIP processors for RIP processing,
the allocating comprising:
dividing the job data based on a predetermined data size regardless of page breaks,
allocating job data that is to be RIP processed to the plurality of RIP processors,
sending job data corresponding to the pages of the job data that are to be RIP processed, to the plurality of RIP processors, wherein
if an initial part of the job data that is to be RIP processed is in the middle of a page, the plurality of RIP processors RIP processing the job data from the beginning of the next page, and
if an end part of the job data that is to be RIP processed and allocated to the RIP processor is in the middle of a page, the RIP processor acquires the job data to the end of the page based on the job data subsequent to the pages of the job data that are to be RIP processed, and RIP processes to the end of the page.

6. The image processing method according to claim 5, further comprising integrating, in page order, the raster image data that have been expanded by the plurality of RIP processors.

7. An image processing apparatus comprising:
a receiving unit that receives job data for a plurality of pages;
a plurality of RIP processors that interpret and expand the job data into raster images; and
an allocating unit that allocates the job data for the plurality of pages to the plurality of RIP processors for RIP processing,
the allocating unit dividing the job data based on a predetermined data size regardless of page breaks, allocating job data that is to be RIP processed to the plurality of RIP processors, and sending job data corresponding to the pages of the job data that are to be RIP processed, to the plurality of RIP processors, wherein
if an initial part of the job data that is to be RIP processed as allocated by the allocating unit is in the middle of a page, the plurality of RIP processors acquires the job data to the beginning of the page based on the job data antecedent to the pages of the job data that are to be RIP processed, and RIP processing the job data from the beginning of the page, and
if an end part of the job data that is to be RIP processed and allocated to the RIP processor is in the middle of a page, the RIP processor RIP processes to the end of the previous page.

8. A non-transitory computer-readable storage medium storing a program for causing a computer to execute image processing, the image processing comprising:
receiving job data for a plurality of pages;
using a plurality of RIP processors, interpreting and expanding the job data into raster images; and
allocating the job data for the plurality of pages to the plurality of RIP processors for RIP processing,
the allocating comprising:
dividing the job data based on a predetermined data size regardless of page breaks,
allocating job data that is to be RIP processed to the plurality of RIP processors, and
sending job data corresponding to the pages of the job data that are to be RIP processed, to the plurality of RIP processors, wherein
if an initial part of the job data that is to be RIP processed as allocated by the allocating unit is in the middle of a page, the plurality of RIP processors acquires the job data to the beginning of the page based on the job data antecedent to the pages of the job data that are to be RIP processed, and RIP processing the job data from the beginning of the page, and if an end part of the job data that is to be RIP processed and allocated to the RIP processor is in the middle of a page, the RIP processor RIP processes to the end of the previous page.

9. An image processing method comprising:

receiving job data for a plurality of pages;

using a plurality of RIP processors, interpreting and expanding the job data into raster images; and allocating the job data for the plurality of pages to the plurality of RIP processors for RIP processing, the allocating comprising:

dividing the job data based on a predetermined data size regardless of page breaks, allocating job data that is to be RIP processed to the plurality of RIP processors, and sending job data corresponding to the pages of the job data that are to be RIP processed, to the plurality of RIP processors, wherein if an initial part of the job data that is to be RIP processed as allocated by the allocating unit is in the middle of a page, the plurality of RIP processors acquires the job data to the beginning of the page based on the job data antecedent to the pages of the job data that are to be RIP processed, and RIP processing the job data from the beginning of the page, and if an end part of the job data that is to be RIP processed and allocated to the RIP processor is in the middle of a page, the RIP processor RIP processes to the end of the previous page.

\* \* \* \* \*